United States Patent
Iizuka et al.

(10) Patent No.: US 8,097,995 B2
(45) Date of Patent: Jan. 17, 2012

(54) SPLIT STATOR FOR ELECTRIC MOTOR AND MANUFACTURING METHOD OF THE SAME

(75) Inventors: Shinichi Iizuka, Osaka (JP); Kouzou Kimura, Osaka (JP); Kazushi Kusawake, Osaka (JP); Yutaka Komatsu, Osaka (JP); Kazutaka Tatematsu, Nagoya (JP)

(73) Assignees: Sumitomo Electric Industries, Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 110 days.

(21) Appl. No.: 12/599,139

(22) PCT Filed: Apr. 28, 2008

(86) PCT No.: PCT/JP2008/058167
§ 371 (c)(1),
(2), (4) Date: Nov. 6, 2009

(87) PCT Pub. No.: WO2008/139912
PCT Pub. Date: Nov. 20, 2008

(65) Prior Publication Data
US 2010/0213784 A1    Aug. 26, 2010

(30) Foreign Application Priority Data
May 8, 2007    (JP) ................. 2007-123006

(51) Int. Cl.
*H02K 3/48* (2006.01)
(52) U.S. Cl. ...................................... 310/214
(58) Field of Classification Search .............. 310/214, 310/215, 216.058, 64, 43
See application file for complete search history.

(56) References Cited

U.S. PATENT DOCUMENTS

| | | | | |
|---|---|---|---|---|
| 4,562,164 A | * | 12/1985 | Miyazaki et al. | 501/151 |
| 4,827,597 A | * | 5/1989 | Hein et al. | 29/596 |
| 6,509,665 B1 | | 1/2003 | Nishiyama et al. | |
| 2005/0127774 A1 | * | 6/2005 | Sogabe et al. | 310/215 |

FOREIGN PATENT DOCUMENTS

| | | |
|---|---|---|
| JP | 49-053204 | 5/1974 |
| JP | 51-093902 | 7/1976 |
| JP | 2001-128402 | 5/2001 |
| JP | 2004-112961 | 4/2004 |
| JP | 2004-320974 | 11/2004 |
| JP | 2004-328947 | 11/2004 |
| JP | 2005-012861 | 1/2005 |

OTHER PUBLICATIONS

Machine Translation for JP 2005-012861 Jan. 13, 2005.*

* cited by examiner

*Primary Examiner* — Nguyen N Hanh
(74) *Attorney, Agent, or Firm* — McDermott Will & Emery LLP

(57) ABSTRACT

A split stator for an electric motor includes a core having a tooth portion, a coil formed around the tooth portion, insulation spacers arranged between a surface of the tooth portion and an inner periphery of the coil, and holding the inner periphery of the coil with a space kept from the surface of the tooth portion, and a resin filler material having high thermal conductivity and filling the space. The resin filler material is configured to allow heat release from the inner periphery of coil to the core.

2 Claims, 6 Drawing Sheets

SPLIT STATOR FOR ELECTRIC MOTOR AND MANUFACTURING METHOD OF THE SAME

RELATED APPLICATIONS

This application is the U.S. National Phase under 35 U.S.C. §371 of International Application No. PCT/JP2008/058167, filed on Apr. 28, 2008, which in turn claims the benefit of Japanese Application No. 2007-123006, filed on May 8, 2007, the disclosures of which Applications are incorporated by reference herein.

TECHNICAL FIELD

The present invention relates to a split stator for an electric motor as well as a stator for an electric motor using the same. Particularly, the invention relates to a split stator for an electric motor that can efficiently release heat generated in a coil of the electric motor as well as a stator for the electric motor.

BACKGROUND ART

Hybrid vehicles and electric vehicles use an electric motor for driving the vehicle. The electric motor for such driving must have high output and efficiency as well as small size and weight. Therefore, it is required to reduce the weight and size on the order of grams and millimeters without lowering the output.

An electric motor has a coil that is formed by arranging a winding around a core of a stator. For achieving a higher output and a smaller size, it is required to improve a space factor of the coil in the stator or the like as far as possible. Also, a large current flows through the coil for increasing a magnetic force and thereby producing a large output.

The large current increases a quantity of heat that occurs due to a resistance of the winding. When a current value per sectional area of the winding is constant, the heat quantity per volume increases with increase in space factor described above. The heat generated in the winding moves across the neighboring winding portions, and is partially released from an outer layer of the coil. Also, another part of the heat is transferred to the core through an insulator, and is released from a release unit or the like arranged on an outer periphery of the stator. Further another part of the heat is transferred axially through the coil, and is released from a coil end.

The stator is configured to cool the outer layer of the coil and the outer periphery of the core by a cooling medium. However, when the heat generated inside the coil cannot be efficiently released to the outer periphery of the coil and the core, the internal temperature of the coil rises. Meanwhile, it is necessary to ensure electrical insulation between the core and the inner periphery of the coil as well as a function of protecting the winding. For this purpose, a cylindrical insulator made of resin is fitted to the core. Although this resin insulator has a high electrical insulation property, its thermal conductivity is low. Therefore, heat release to the core is suppressed so that the internal temperature of the coil tends to rise. The internal temperature rising of the winding adversely affects an insulation coating of the winding, and thereby lowers insulation properties, which may result in a problem that the output and the life of the electric motor lower.

For overcoming the above problems, it has been proposed to use a member of high thermal conductivity for forming the above insulator.

Patent Document 1: Japanese Patent Laying-Open No. 2001-128402

DISCLOSURE OF THE INVENTION

Problems to be Solved by the Invention

According to the invention described in the above patent document, a high conductivity member is substituted for a part of an insulator. Specifically, this insulator has a hole for arranging the high conductivity member, and a metal plate or a resin sheet having high thermal conductivity is fitted into this hole. According to the above document, the metal plate or the resin sheet is pushed by a pressure applied from the inner periphery of the coil onto the core surface exposed through the hole, and thereby is reliably brought into contact with the core. This improves the thermal conductivity.

In the structure of this document, however, the pressure applied from the inner periphery of the coil can deform the high conductivity member only to a limited extent. Therefore, it is apparent that a space extending along the winding is formed between the inner periphery of the winding and the high conductivity member. Accordingly, a majority of convex and concave surfaces that are complementary in shape to the winding at the inner periphery of the coil are not in contact with the high conductivity member. Therefore, it is impossible to transfer efficiently the heat from the coil to the high conductivity member.

Further, in the structure of this document, a part of the high conductivity member is externally exposed through the hole in the insulator so that this exposed portion receives the pressure from the inner periphery of the coil. However, it cannot be considered that the inner periphery of the coil applies a uniform pressure to the high conductivity member. Therefore, the high conductivity member cannot be brought into close and uniform contact with the core surface by a sufficiently large pressure so that the heat cannot be efficiently transferred from the high conductivity member to the core surface.

Further, it is necessary in this structure to form the hole in the insulator and to fit the high conductivity member into this hole so that this structure apparently and extremely complicates manufacturing operations.

An object of the present invention is to provide a split stator for an electric motor that overcomes the above problems, and can prevent temperature rising inside a coil by improving properties of thermal conduction from an inner periphery of the coil formed by arranging a winding to a surface of a core, and is to provide a stator for an electric motor using the split stators.

Means for Solving the Problems

A split stator for an electric motor according to the invention includes a core, a coil, an insulation spacer and a resin filler material. The core has a tooth portion. The coil is formed by winding a winding around the tooth portion. The insulation spacer member is arranged between a surface of the tooth portion and an inner periphery of the coil for holding the inner periphery of the coil with a space kept from the surface of the tooth portion. The resin filler material fills the space and has high thermal conductivity. Thus, the invention includes the core, the coil formed by winding the winding around the tooth portion of the core, the insulation spacer member arranged between the surface of the tooth portion and the inner periphery of the coil for holding the inner periphery of the coil with the space kept from the surface of the tooth portion, and the resin filler material having high thermal conductivity and filling the space.

According to the above structure, the electrically insulating spacer member holds the inner periphery of the coil with the space kept from the core surface so that the insulation properties are kept between the inner periphery of the coil and the core surface. Also, the space is filled with the resin filler material having high thermal conductivity. Since the resin filler material is supplied to fill irregularities formed along the inner periphery winding of the coil, the inner peripheral surface of the coil can be entirely in contact with the resin having high thermal conductivity. Therefore, the heat generated in the coil can be efficiently released from the inner periphery of the coil through the resin filler material to the core. Further, the resin filler material functions as an adhesive fixing the coil to the core. Therefore, such an effect can be expected that the resin filler material prevents disengagement of the coil and the spacer from the core as well as deviation and deformation thereof.

The form of the space is not restricted. However, as employed in the invention according to claim 2, it is preferable that the space has a strip-like form extending perpendicularly to a winding direction of the winding. For improving heat releasing properties, it is preferable that the space has a length corresponding to the axial size of the coil. In other words, it is preferable that the space has a strip-like form extending along a generating line of the tooth portion having a columnar form. The space thus formed is filled with the resin having high thermal conductivity.

The material and form of the spacer member are not particularly restricted. Since the invention can increase a quantity of heat released from the inner periphery of the coil through the resin filler material, various materials can be employed for the spacer member provided that the material has high electrical insulation properties. Since the spacer member does not require a complicated form or shape in contrast to a conventional insulator, a spacer member of inorganic material having poor formability or moldability can be employed. Further, after the winding is wound, the resin filler material adheres and fixes the coil to the core. Therefore, the material and form of the spacer member are merely required to exhibit a strength allowing such winding of the winding. For facilitating the winding operation for the winding, the spacer member is preferably attached in advance to the core by an adhesive.

In the invention according to claim 4, the split stator may employ the spacer member that has a plurality of rod-like portions arranged along a generating line of the columnar tooth portion, and the space between the inner periphery of the coil and the surface of the tooth portion may be filled with the resin filler material. When the plurality of rod-like portions are circumferentially equally spaced from each other, the spacer member having a grate-like form holds the inner periphery of the coil. The plurality of rod-like portions forming the spacer member may be integral with each other, and may be formed of a combination of a plurality of rod-like members.

The resin filler material may be supplied into the space before arranging the winding or after arranging it. When supplying the resin filler material before arranging the winding, a nozzle, roller or spray device may be used for supplying the resin filler material into the space.

For supplying the resin filler material, the split stator preferably has an opening allowing supply of the resin filler material into the space, as described in claim 3. The opening may be opened on an outer surface of the split stator. Thereby, the resin having high thermal conductivity can be supplied through the opening even after the winding is arranged to form the coil. Also, the resin can be supplied after a first winding layer of the winding is formed.

The resin filler material having high thermal conductivity is not particularly restricted. For example, it may be made of polyamide resin dissolved in a solvent. More specifically, High Melt Series 7375 of Hot-Melt (Trademark) adhesive manufactured by Sumitomo 3M Limited may be employed, and the resin filler having thermal conductivity may be dispersed therein to provide the resin filler material having high thermal conductivity. For improving the electrical insulation properties, it is preferable to employ inorganic filler such as silica or alumina.

In the invention according to claim 5, the spacer member has a plurality of members formed by recessing a portion of a cylindrical member between a plurality of its sections extending in an axial direction of the cylindrical member, and the space formed between the plurality of members is filled with the resin filler material. In other words, the plurality of members spaced from each other provide the spacer member ensuring a conventional insulation function.

By employing the above form, the formation and assembly of the spacer member can be performed in substantially the same manner as that for attaching a conventional insulator. The width of the space formed between the spacer members and the number of the split members are not restricted. For example, two split spacer members may be formed by forming a recess of a large width in a portion corresponding to a portion where a winding is linearly arranged in a conventional cylindrical insulator. Spacers of a form corresponding to a conventional insulator form may be arranged at four corners of the tooth portion having substantially a rectangular section.

Likewise, the form of the core is not restricted, and it may be formed by sintering compressed metal powder, or may be a stack of magnetic steel plates. The core formed of the stack of magnetic steel plates has irregularities at its surface due to the stacked layers of the steel sheets. The invention can form the resin filler material that is in close contact with such irregularities so that high heat releasing effect can be expected.

In the invention according to claim 6, the spacer member covers at least a corner of the tooth member located under the wound winding, and has a curved outer peripheral surface capable of carrying the winding.

On the corner of the tooth portion, it is necessary to wind the winding with a large radius of curvature for preventing damage to the winding. Therefore, the provision of the spacer member that has the curved outer peripheral surface carrying the winding can prevent the damage to the winding, and can hold the winding with the space kept from the core surface. Although the radius of curvature of the curved surface is not restricted, it is desired that the radius of curvature is twice or more as large as the radius of the winding.

Further, as employed in the invention according to claim 7, it is preferable that the spacer member is adhered to the surface of the core by a thermally conductive adhesive. This allows an operation of winding the winding while keeping a state in which the plurality of spacer members are integrally held on the core. Also, the heat releasing to the core can be performed through the spacer member.

Particularly, in the stator provided with the core portion that is formed of the stack of the magnetic steel sheets, a stepped portion is formed for ensuring the radius of curvature of the winding on the corner, and therefore a space is often formed with respect to the inner periphery of the spacer member. By fixing the spacer member arranged on the corner to the core by the adhesive having high thermal conductivity, the space is filled with the adhesive of high thermal conductivity, and the heat generated in the winding can be transferred to the core through a bottom surface of the spacer member.

A stator for an electric motor according to the invention includes a plurality of portions assembled together to form an annular form. Each of the plurality of portions has the split stator for the electric motor that is already described. Thus, the stator for the electric motor is formed of an annular assembly of the plurality of split stators.

A method of manufacturing a split stator for an electric motor according to the invention is a method of manufacturing a split stator including a core having a tooth portion, and a coil formed by arranging a winding around the tooth portion. First, in this manufacturing method, an insulation spacer member is arranged on a part of a surface of the tooth portion. The winding is arranged around the spacer member to form the coil having an inner periphery with a space kept from a part of the surface of the tooth portion. The space is filled with a resin filler material having high thermal conductivity.

The manner of executing the above steps is not particularly restricted. The step of arranging or winding the winding may be performed before or after the step of supplying the resin filler material.

Effects of the Invention

The invention can prevent rising of the temperature inside the coil by improving the conductivity of heat from the inner periphery of the coil to the core surface, while ensuring the insulation properties.

DESCRIPTION OF THE REFERENCE SIGNS 1 stator, 2 split stator, 3 core, 4 tooth portion, 5A spacer member, 5B spacer member, 6 winding, 7 coil, 10 space, 12 resin filler material

BEST MODES FOR CARRYING OUT THE INVENTION

Figure 1:
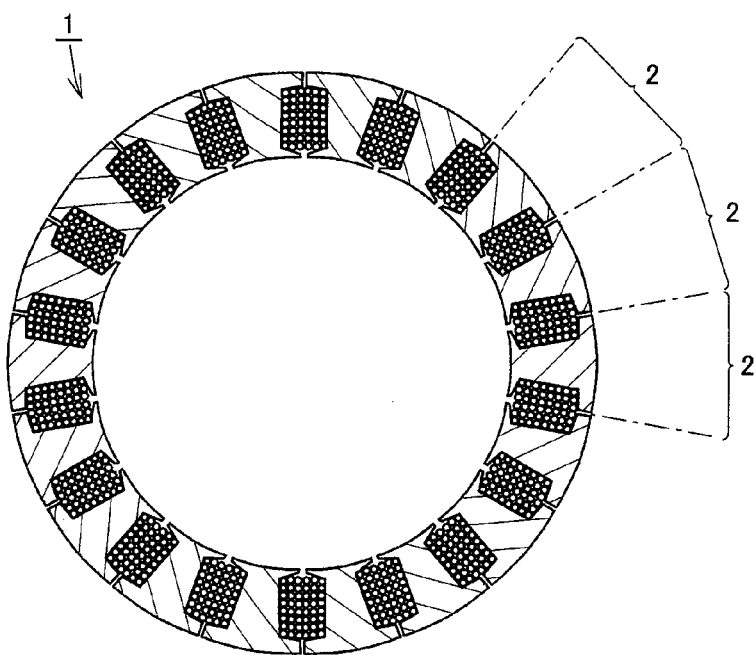
FIG. 1 is a cross section schematically showing a structure of a stator of the invention.

As shown in FIG. 1, an embodiment is implemented by applying the invention to each of split stators 2 of a concentrated winding stator 1 for an electric motor, and stator 1 is formed by a combination of the plurality of split stators that are provided with coils and are annularly arranged.

The plurality of split stators 2 are assembled into stator 1 by arranging split stators 2 into an annular form, and then externally surrounding them by a ring member or the like (not shown) to fix them together. More specifically, stator 1 for an electric motor has a plurality of parts assembled together into an annular form, and each of these parts has split stator 2. A rotor (not shown) provided with a permanent magnet is arranged inside stator 1 for forming the electric motor. For easy understanding of the whole structure of stator 1 formed of split stators 2, FIG. 1 shows a section perpendicular to an axis of the annular form of stator 1.

FIGS. 2 to 6 show a first embodiment of the split stator according to the invention. As shown in these figures, split stator 2 includes a core 3, a coil 7, insulation spacer members 5A and 5B, and a resin filler material 12. Core 3 has a tooth portion 4. Coil 7 is formed by winding a winding 6 around tooth portion 4. Insulation spacer members 5A and 5B are arranged between the surface of tooth portion 4 and the inner periphery of coil 7, and holds the inner periphery of coil 7 to keep a space from the surface of tooth portion 4. Resin filler material 12 fills the space, and has high thermal conductivity. The structure of split stator 2 will be described below in detail.

Figure 2:
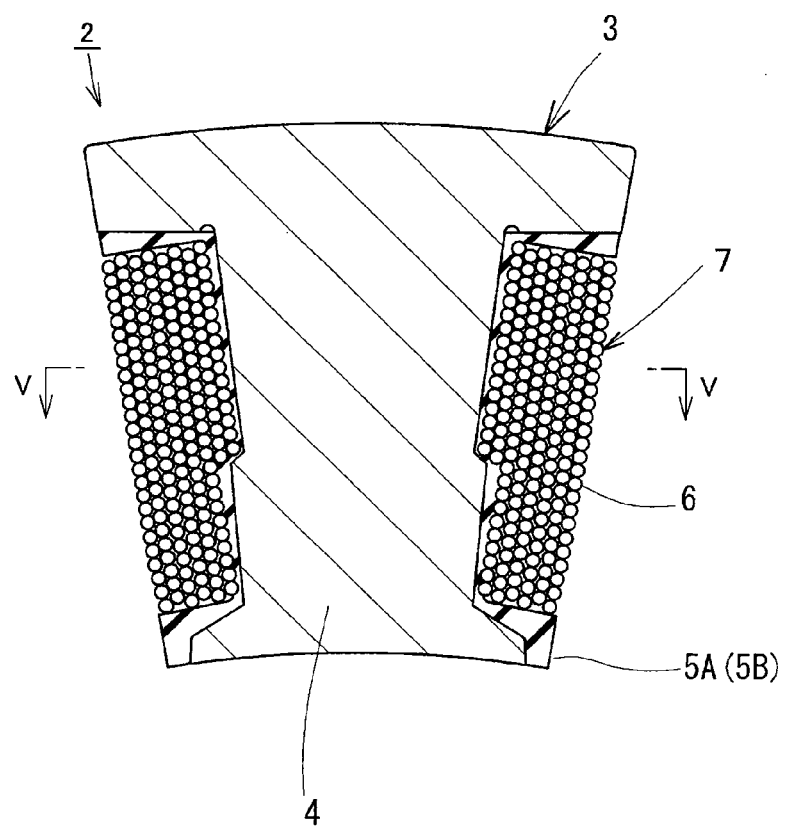
FIG. 2 is a cross section schematically showing a structure of a split stator forming the stator shown in FIG. 1.

As shown in FIG. 2, split stator 2 includes core 3 of a ferromagnetic material formed by sintering a work that is formed, e.g., by compression molding of powder metal, spacer members 5A and 5B made of resin and fitted to tooth portion 4 of core 3, and coil 7 formed by arranging winding 6 around spacer members 5A and 5B.

Figure 3:
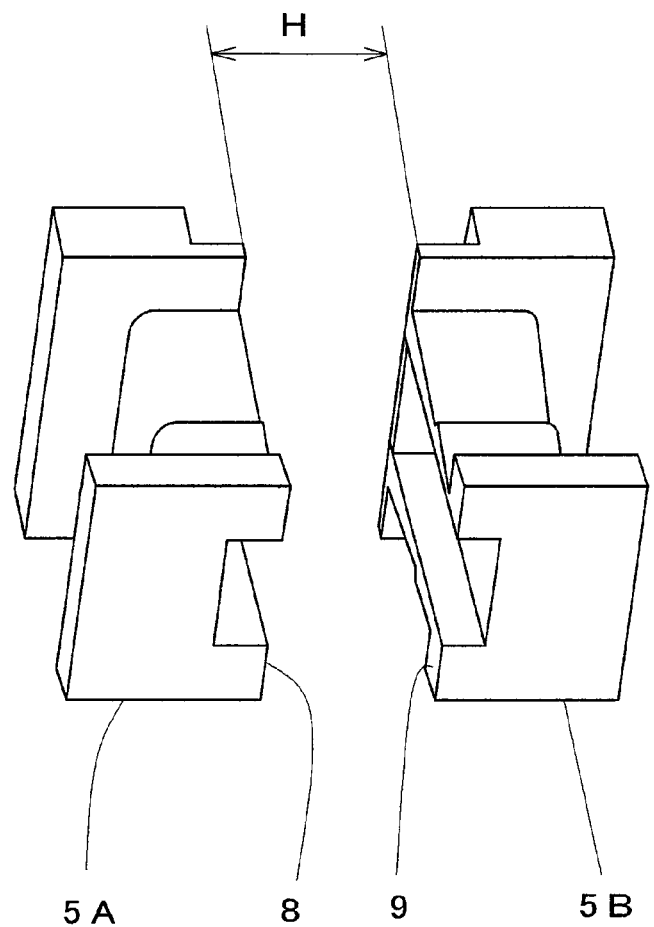
FIG. 3 is a perspective view showing a whole form of a first embodiment of a spacer member employed in a split stator shown in FIG. 2.

FIG. 3 shows whole forms of spacer members 5A and 5B shown in FIG. 2.

Spacer members 5A and 5B are formed using a form of a conventional cylindrical insulator that is fitted around an entire periphery of tooth portion 4 shown in FIG. 2. More specifically, as shown in FIG. 3, spacer members 5A and 5B are produced by recessing a side wall of the cylindrical resin insulator to be fitted to core 3 to form section planes 8 and 9, which are perpendicular to a winding direction of the winding, are spaced from each other by a size H and are parallel to the axial direction of the cylindrical form.

Figure 4:
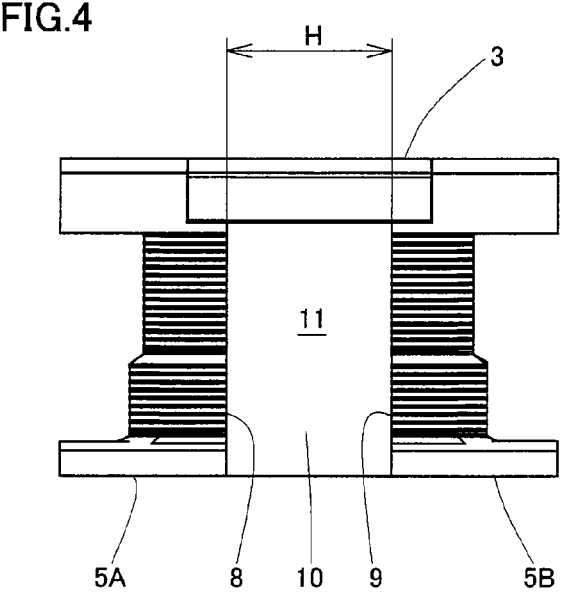
FIG. 4 is an elevation showing a state in which the spacer members shown in FIG. 3 are attached to the core.

FIG. 4 is an elevation showing a state in which the pair of spacer members 5A and 5B are attached to core 3. As shown in FIG. 4, a surface 11 of core 3 is exposed through a space 10 formed between section planes 8 and 9. Exposed surface 11 of core 3 is a portion over which winding 6 (not shown in FIG. 4) is wound linearly, and recessing of this portion does not impede a winding operation of winding 6. By arranging winding 6 around core 3, space 10 corresponding to the thickness of spacer members 5A and 5B is formed between the inner periphery of coil 7, surface 11 of core 3 and the pair of section planes 8 and 9.

Figure 5:
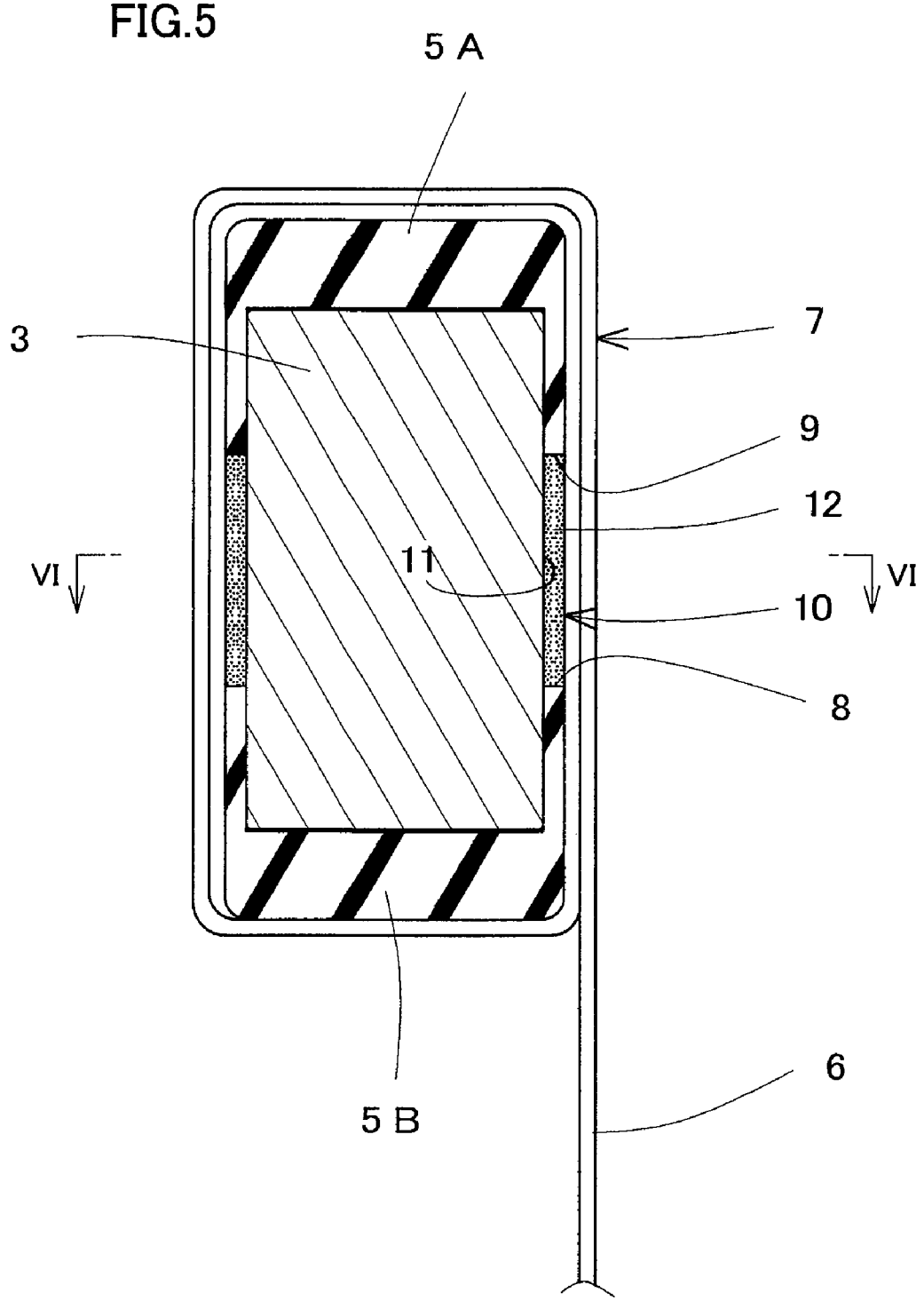
FIG. 5 is a cross section taken along line V-V in FIG. 2 and shows a state in which a winding is wound around the core provided with the spacer members shown in FIG. 3.

FIG. 5 shows a state in which winding 6 is wound around core 3 provided with spacer members 5A and 5B shown in FIG. 3, and shows a cross section taken along line V-V in FIG. 2. As shown in FIG. 5, space 10 defined between the inner periphery of coil 7, each of section planes 8 and 9 of respective spacer members 5A and 5B, and exposed surface 11 of core 3.

In this embodiment, coil 7 is formed by supplying resin filler material 12 having high thermal conductivity into space 10, and then arranging winding 6 before resin filler material 12 cures. The inner periphery of coil 7 is held to keep space 10 corresponding to the thickness of spacer members 5A and 5B from exposed surface 11 of core 3 with spacer members 5A and 5B therebetween. Space 10 is fully filled with resin filler material 12.

Figure 6:
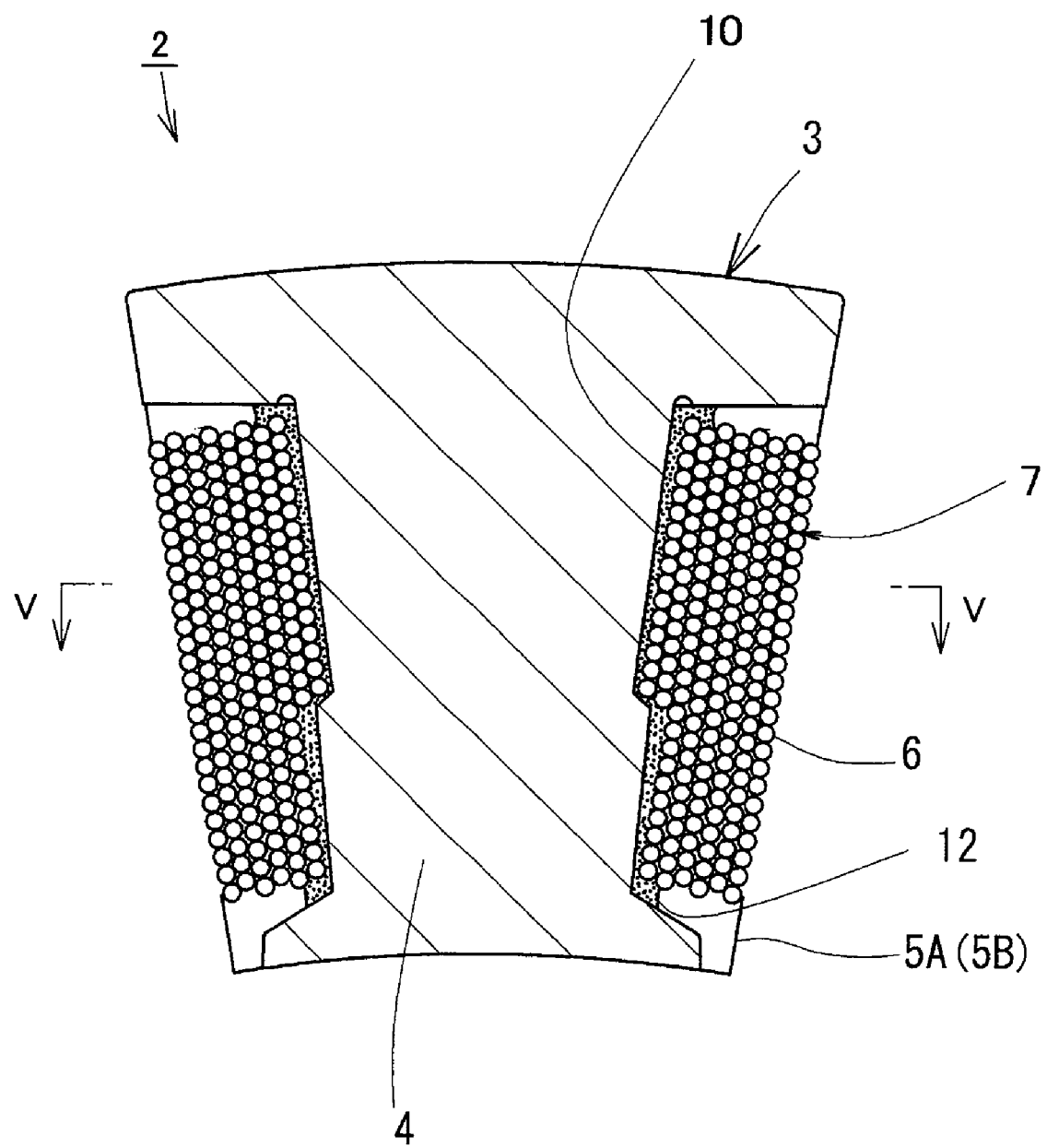
FIG. 6 is a cross section taken along line VI-VI in FIG. 5.

FIG. 6 is a cross section taken along line VI-VI in FIG. 5. FIG. 6 shows a state after coil 7 is completed. As shown in FIG. 6, the inner periphery of coil 7 is held to keep space 10 from the surface of tooth portion 4 of core 3. Space 10 is filled with resin filler material 12. In this embodiment, the surface of tooth portion 4 of core 3 has a stepped section, which improves an occupancy of the winding. Spacer members 5A and 5B have sections complementary in shape to the above section. This structure can reduce the thicknesses of spacer members 5A and 5B themselves, and can reduce the thickness of space 10. Further, it can improve the thermal conductivity of resin filler material 12.

Since the above structure is employed, space 10 formed between the inner peripheral surface of coil 7 and exposed surface 11 is filled with resin filler material 12, and therefore the heat of core 3 can be released through resin filler material 12. Further, resin filler material 12 functions as an adhesive that fixes the inner periphery of coil 7 and spacer members 5A and 5B to the surface of core 3. Therefore, it can prevent deformation and deviation of coil 7.

Resin filler material 12 is not particularly restricted, and may be any resin filler material having high thermal conductivity and electrical insulation properties. It can be expected that sufficient effect is achieved when resin filler material 12 has the thermal conductivity higher than that of at least a conventional resin insulator. For example, the resin filler material may be made of polyamide resin dissolved in a solvent and inorganic filler such as alumina or silica dispersed therein. Specifically, the resin material is High Melt Series 7375 of Hot-Melt (Trademark) adhesive manufactured by Sumitomo 3M Limited, and the filler such as alumina or silica is dispersed therein so that the resin filler material can be produced.

Figure 7:
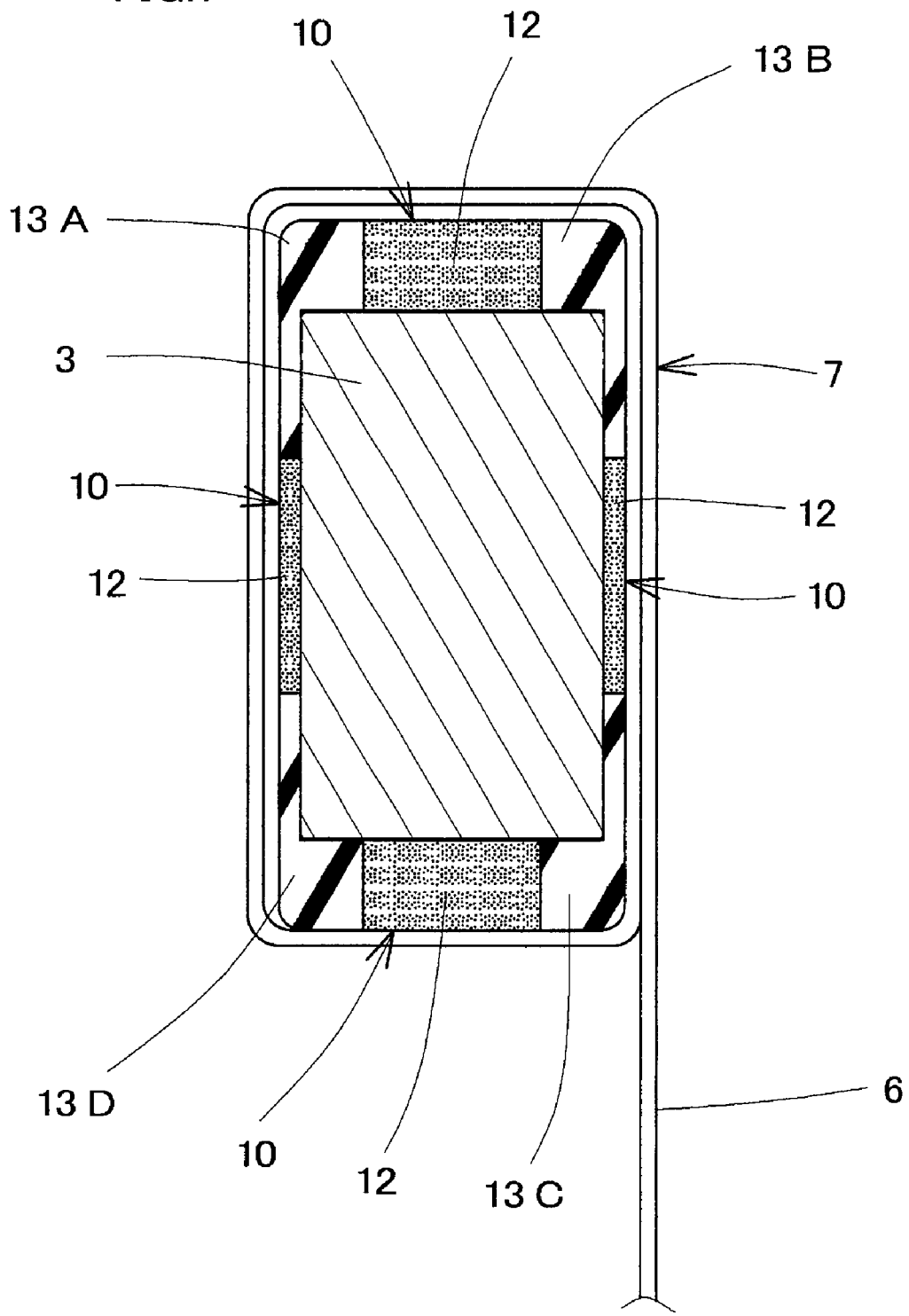
FIG. 7 is a cross section corresponding to FIG. 5, and shows a state in which a winding is wound around a core provided with spacer members according to a second embodiment.

FIG. 7 shows a second embodiment of the split stator according to the invention. FIG. 7 shows a section corresponding to that taken along line V-V in FIG. 2.

In this embodiment, core 3 having a substantially rectangular form is provided at its four corners with four spacer members 13A, 13B, 13C and 13D holding coil 7, respectively. Spacer members 13A, 13B, 13C and 13D may have forms prepared by further dividing each of paired spacer members 5A and 5B shown in FIG. 3 into halves, and also may have other forms. Preferably, these spaces are adhered in advance to the surface of core 3.

By employing the structure shown in FIG. 7, space 10 can be formed in a wide range between the inner periphery of coil 7 and core 3, and can be filled with resin filler material 12. Therefore, this structure can have high heat releasing properties with respect to core 3.

Figure 8:
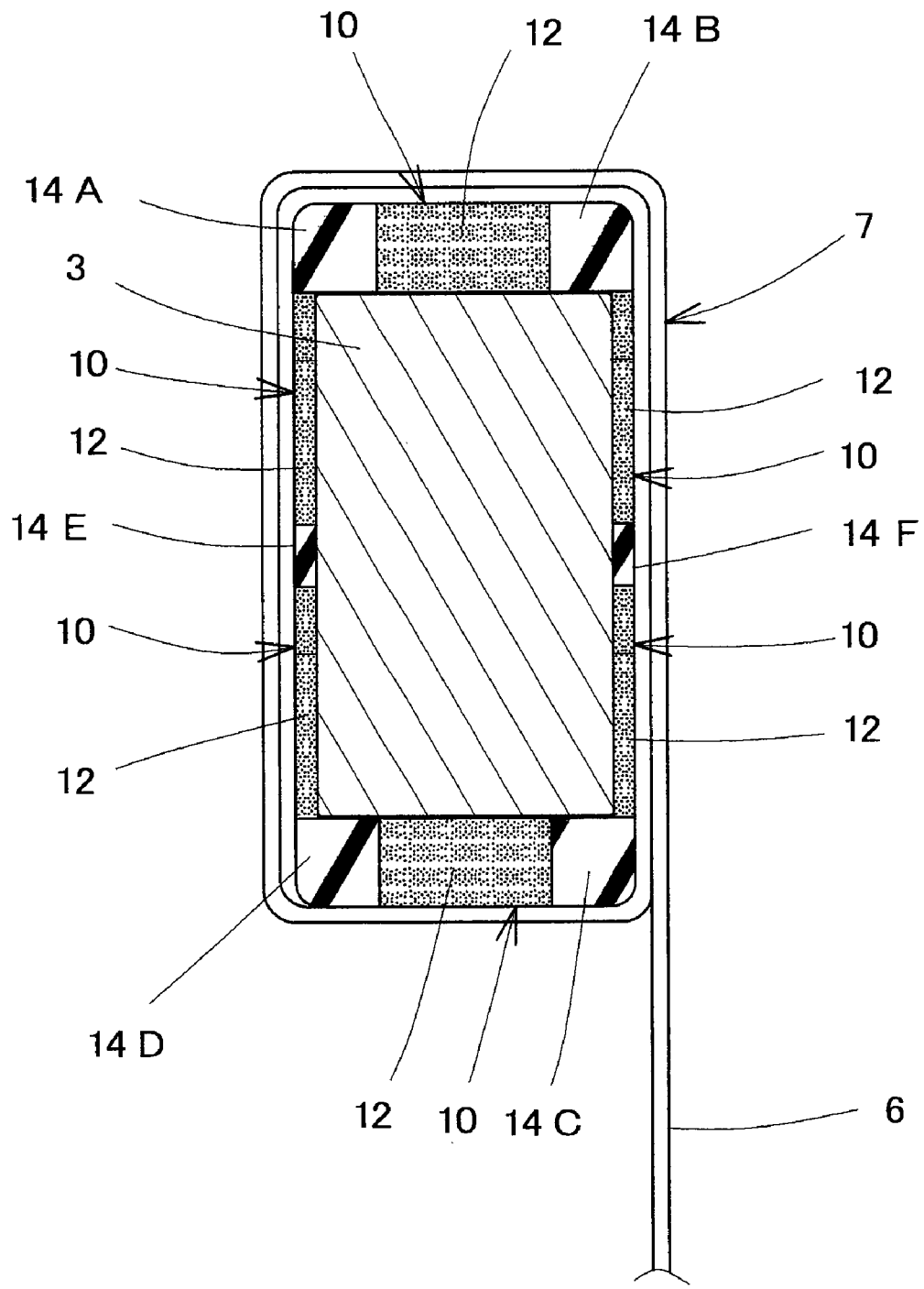
FIG. 8 is a cross section corresponding to FIG. 5, and shows a state in which a winding is wound around a core provided with spacer members according to a third embodiment.

FIG. 8 shows a third embodiment relating to the spacer member. FIG. 8 shows a section corresponding to that taken along line V-V in FIG. 2.

For further increasing the width of space 10 and for reliably holding coil 7 with space 10 kept thereto, the embodiment shown in FIG. 8 includes rod-like spacer members 14E and 14F located at a central portion of the longitudinal plane in addition to spacer members 14A, 14B, 14C and 14D on the corners. The addition of spacer members 14E and 14F can accurately set the size of space 10 between the inner periphery of coil 7 and the exposed surface of core 3 so that it becomes possible to form space 10 of an extremely small thickness. Also, it is possible to form a large exposed surface on core 3. Rod-like spacer members 14E and 14F may be integral with spacer members 14A, 14B, 14C and 14D, and may also be independent of them.

In the above embodiments, the form of the conventional insulator is utilized for forming the spacer members. However, the spacer members may have various forms provided that they allow the arrangement of winding 6 and can hold the inner periphery of coil 7 with space 10 kept from the surface of core 3.

In the above embodiments, resin filler material 12 is supplied into space 10 before the winding operation of winding 6. However, this is not restrictive. The body of core 3 or the spacer member may be provided with an opening extending from the outer surface of split stator 2 to space 10, and resin filler material 12 may be supplied into space 10 through this opening after or during the winding operation of winding 6.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A split stator for an electric motor comprising:
   a core having a tooth portion;
   a coil formed by winding a winding around said tooth portion;
   an insulation spacer member arranged between a surface of said tooth portion and an inner periphery of said coil for holding the inner periphery of said coil with a space kept from the surface of said tooth portion; and
   a resin filler material having high thermal conductivity and filling said space, wherein:
   said tooth portion has a columnar form having a generating line, and
   said spacer member has a plurality of rod-like portions arranged along said generating line.

2. A split stator for an electric motor comprising:
   a core having a tooth portion;
   a coil formed by winding a winding around said tooth portion;
   an insulation spacer member arranged between a surface of said tooth portion and an inner periphery of said coil for holding the inner periphery of said coil with a space kept from the surface of said tooth portion; and
   a resin filler material having high thermal conductivity and filling said space, wherein:
   said spacer member has a plurality of members formed by recessing a portion of a cylindrical member between a plurality of its sections extending in an axial direction of said cylindrical member, and
   said space is formed between said plurality of members.

* * * * *